July 19, 1932. W. J. BROCKER 1,867,548
APPARATUS FOR CONDITIONING AIR
Filed June 24, 1931 2 Sheets-Sheet 1

Inventor
William J. Brocker
By Wilkinson & Mawhinney
Attorneys.

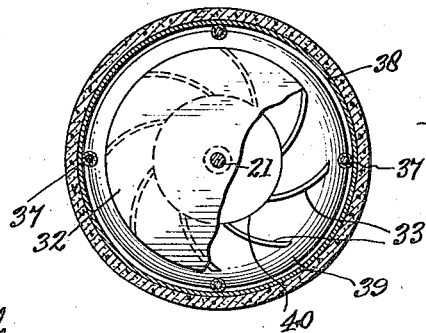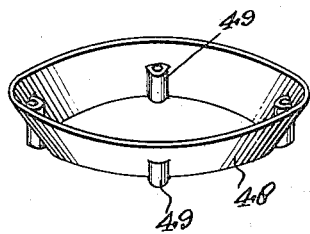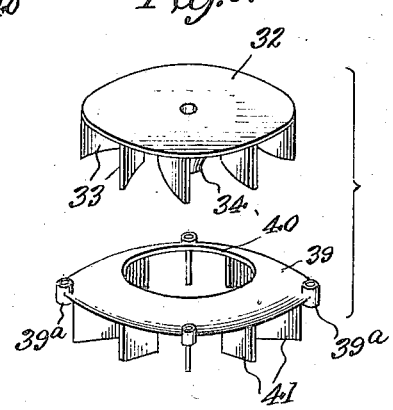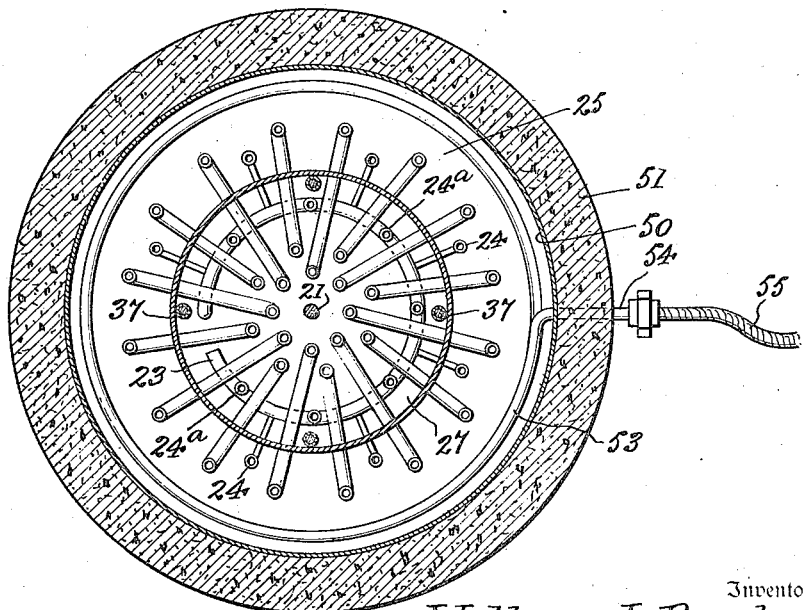

Patented July 19, 1932

1,867,548

UNITED STATES PATENT OFFICE

WILLIAM J. BROCKER, OF TAMPA, FLORIDA

APPARATUS FOR CONDITIONING AIR

Application filed June 24, 1931. Serial No. 546,626.

The present invention relates to improvements in apparatus for conditioning air, and has for an object to provide an improved portable device of a compact and relatively inexpensive nature whereby the circulation of cooled or heated and properly moistened air is promoted throughout a room or building with healthful and other beneficial results.

Another object of the invention is to provide an improved apparatus for conditioning air, in which a positive and forced circulation of the air through the apparatus will be had at all times during the operation of the apparatus, and in which moisture is entrained with the air, and the air may be heated or cooled, as desired, to provide suitable indoor atmospheric conditions for both summer and winter.

With the foregoing and other objects in view, the invention will be more fully described hereinafter, and will be more particularly pointed out in the claims appended hereto.

In the drawings, wherein like symbols refer to like or corresponding parts throughout the several views.

Figure 2 is a transverse section through the upper portion of the apparatus substantially on the line 2—2 in Figure 1.

Figure 3 is a transverse section through the intermediate portion of the apparatus taken on the line 3—3 in Figure 1.

Figure 4 is a detail perspective view of one of the louvre rings disposed at the upper end of the apparatus, and Figure 5 is a detail perspective view of the disk and baffle ring structure in the upper part of the apparatus.

Figure 1:
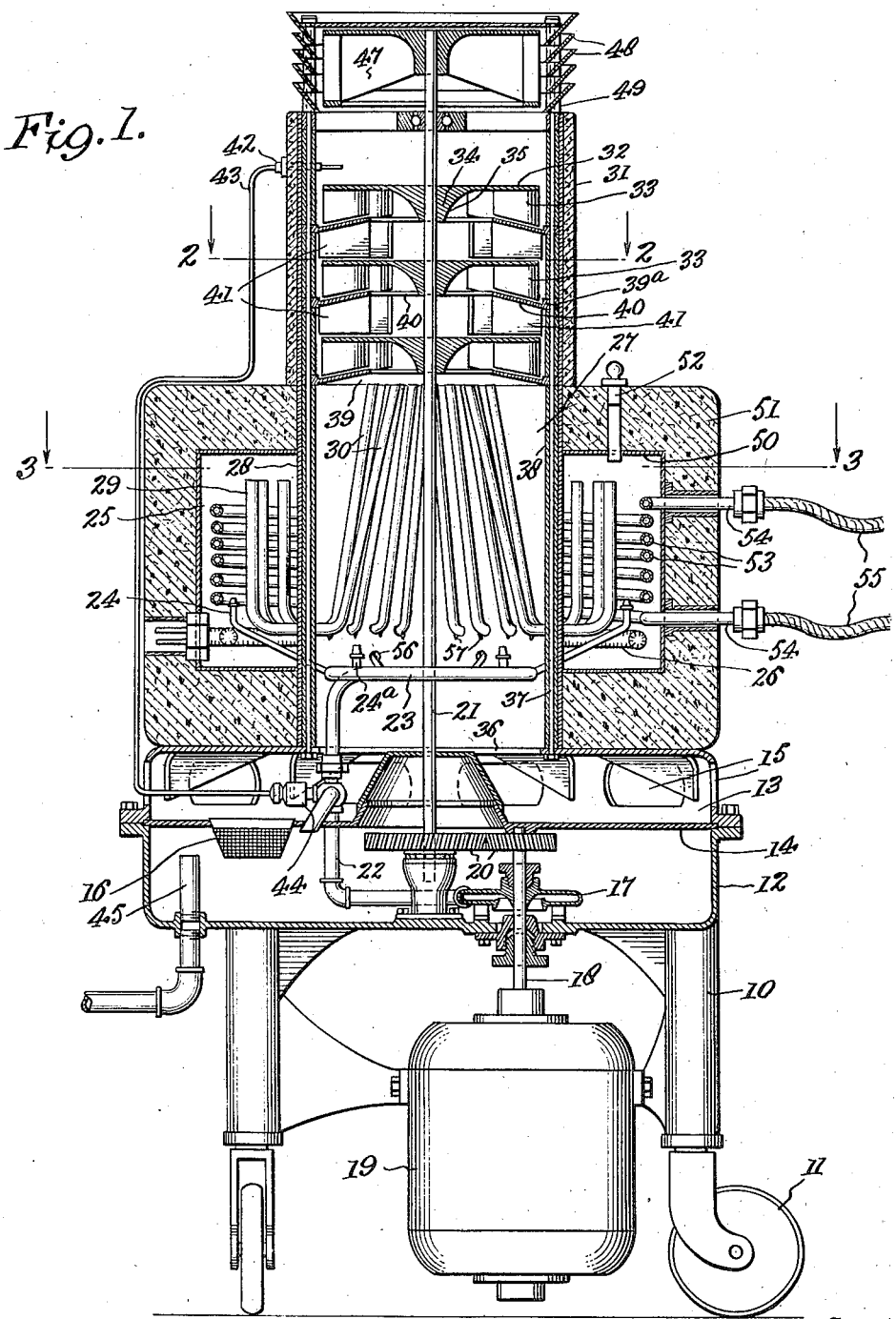
Figure 1 is a vertical section through an improved apparatus for conditioning air constructed in accordance with the present invention.

Referring more particularly to the drawings. 10 designates a carriage mounted upon casters 11 for easy movement, whereby to provide a portatable apparatus. While the present embodiment is shown as of the portable type, it is of course understood that in larger machines the apparatus may be made stationary and the carriage or frame 10 may be given any suitable configuration adaptable to a permanent installation.

Upon this carriage is mounted a water reservoir 12, in which a body of water may be contained up to an appropriate level. Above the water reservoir 12 is an air compartment 13 separated from the water reservoir by a partition 14 and having openings 15 whereby to provide free communication with the outside atmosphere. At one or more suitable points, the partition 14 is provided with an aperture therethrough intercommunicating the reservoir 12 with the air compartment 13, and the intercommunicating opening is preferably provided with a screen 16 which may be of conical or other configuration and which extends downwardly through the partition 14, as shown in Figure 1.

In the water reservoir 12 is a pump 17 mounted upon a shaft 18 driven by an electric or other motor 19 carried by the apparatus. The motor and pump shaft 18 extends above the pump 17 and is connected by fiber reduction gear wheels 20 to a central shaft 21 useful for a purpose later described.

The pump 16 is connected by a pipe 22 to a spray ring 23 provided with a plurality of elongated nozzles 24 which extend radially from the ring 23 and open upwardly into the lower end of a vaporizing chamber 25. The ring 23 is also provided with a plurality of relatively short upwardly directed spray heads or nozzles 24a which are preferably of substantialy the same number and capacity as the outer spray nozlzes or heads 24. The vaporizing chamber 25 is provided near its lower end with a suitable electric or other heating unit 26 adapted to be plugged into the house service current or other suitable electrical supply.

The vaporizing chamber 25 is separated from a central mixing chamber 27 by a partition wall 28, through which U-tubes project. The outer legs 29 of these tubes lie within the vaporizing chamber 23 and are open at their upper ends into the upper portion of such chamber. The inner legs 30 of the tubes are disposed at a slightly different angle than the outer legs 29 and the upper ends thereof open into the upper portion of the mixing chamber 27. It will be noted that the legs 30 all converge upwardly in the mixing chamber 27 up through which the air is drawn, as later described.

Above the mixing chamber 27 is a cleaning unit contained within an insulated casing 31. This unit is shown more particularly in Figures 1, 2 and 5 and includes the rotary fan elements composed of the solid upper disks 32, the curved blades 33 and the hub 34 which fits upon the central shaft 21, there being a relatively large opening between the hub 34 and the inner edges of the blades 33 at the underside of the disk 32.

It will be noted from Figure 1 in particular that the lower portion of each hub 34 is tapered so as to be of reduced diameter at its lower end, and this structure provides a curved or upwardly and outwardly sweeping surface 35 for directing air radially outwardly into the passages between the blades 33. In the structural embodiment of the apparatus, the upper wall of the air chamber 13 has a central opening 36 which registers with the mixing chamber 27 and at the marginal portion of which is disposed a number of vertically extending rods or bolts 37. The rods 37 are provided with a plurality of spacing tubes 38 thereon which are of required lengths for supporting certain devices assembled in the apparatus at different heights upon the rods. The rods 37 preferably extend upwardly within the annular wall 28 and are of any desired number and which provide a framework or support for supporting the units of the cleaning devices and of the fan.

Threaded at suitable intervals upon the rods 37 are stationary baffles 39. These baffles 39 are of frusto conical or ring shape and, as shown to advantage in Figure 5, are provided each with a central opening 40 and each with a number of apertured lugs or eye pieces 39a at its outer edge for sliding engagement over the rods 37. These eye pieces 39a are adapted to seat upon the upper ends of the immediately subjacent tubes 38. There is a baffle 39 located beneath each rotary section of the cleaning unit. Each rotary section and baffle plate comprises a stage or section of the cleaning unit and these stages or sections may be spaced apart vertically to any desired extent and may be used in any desired number for creating the necessary tortuous passage upwardly therethrough for the proper treatment of the moistened air.

Each of the baffles 39 carries a plurality of depending tangential vanes or blades 41 which are of substantially the same length as the blades 35 and which cooperate therewith in breaking up the moisture laden air into a plurality of independent upwardly travelling streams.

A humidity regulator 42 is shown as projecting into the upper portion of the cleaning unit and as being connected by a pipe or other connection 43 with a sylphon or other automatic valve 44 which controls the passage of water through the water pipe 22.

The water chamber 12 is provided through its bottom with a drain pipe 45 and the latter may extend upwardly in the reservoir or compartment 12 to a suitable height to serve as an overflow and maintain a desired water level therein. It will be noted that the pipe 22 has a branch which leads from the valve control device 44 and opens into the top of the water compartment 12, so that water from the pump may be exhausted back into the water compartment without undue back pressure on the pump when the spray ring 23 is more or less cut out of communication with the pump.

The driven shaft 21 extends up through the mixing chamber 27 and up through and beyond the cleaning unit. The hubs 34 of the several cleaning blowers or fans are affixed to this shaft 21, and a circulating fan 47 is mounted upon the upper portion of the shaft 21 and is for the purpose of drawing air through the entire humidifying apparatus and discharging the same outwardly in a number of upwardly directed hollow cones through the circular louvre rings or slats 48.

Each louvre ring 48 is provided at its lower or base portion with a plurality of eye pieces 49 which are adapted to slidably engage over the upper end portions of the rods 37, and these eye pieces 49 are of suitable length to abut in end to end engagement with the respective superposed rings to hold the latter in spaced apart relation, as shown in Figure 1. Thus the rings 48 are supported in spaced apart but in nested relation so that the air, which is driven upwardly and outwardly of the apparatus, is divided into a plurality of concentric hollow cones. The upper ends of the rods 37 may be provided with nuts or any other suitable fastening devices adapted to clamp the tubes 38 and the eyes of the various other parts of the apparatus in tightly assembled relation and so as to reinforce and strengthen the upper part of the device. The vaporizing chamber 23 is formed within a suitable casing 50 of any suitable material, but which is jacketed in a relatively thick insulating lining or covering 51 of cork or asbestos, which may be made in two sections adapted to fit together by introduction upon opposite sides of the vaporizing chamber casing 50. The covering 51 and the casing 50 are provided with large openings therethrough adapted for the reception of thermostats 52 which may be used for ascertaining the temperature condition of the air in the top of the vaporizing chamber 25.

While the heating unit 26 is used for raising the temperature of the air, the apparatus is designed to reduce the temperature of the air under certain conditions which are required in the proper tempering of the air. For this purpose, a suitable cooling coil 53 is arranged in the vaporizing chamber 25 in spaced relation about the outer legs 29 of the U-tubes, and the opposite ends 54 of the cooling coil 53 are carried through one side of the apparatus and may be connected by flexible pipes 55 or the like to a source of cooling medium and supply control such as is used in ordinary refrigerating systems. The partition wall 28 is provided, at substantially the bottom of the vaporizing chamber 25, with drain openings 56 which comprise merely enlargements of the openings through which the outer nozzles 24 pass. By making these openings larger around the stems of the nozzles 24, the water accumulating in the bottom of the vaporizing chamber may overflow through the openings 56 to the lower end of the mixing chamber 27 and may thus flow downwardly through the air chamber 13, the screen 16 and back into the reservoir.

It will be noted, particularly from Figure 1, that the upper ends of the inner legs 30 rise to a point which is closely spaced from the horizontal plane of the opening 40 through the lower baffle 39, and that these upper ends of the legs 30 converge into a cylindrical group formation lying substantially wholly within the vertical margin of the opening 40. This effects an induced draft of the desired relatively high pressure.

In the use of the device, water or other appropriate liquid is introduced into the reservoir 12 as by a hose or funnel through one of the openings 15 in the air compartment 13, the water flowing down through the screen 16, illustrated in Figure 1.

The motor 19 being put in operation and being controlled, for instance from a room thermostat, the water pump 17 will be driven, drawing in water from the reservoir 12 and circulating the same up through the pipe 22 to the spray ring 23. The water will thus be sprayed into the vaporizing chamber 23 and into the mixing chamber 27 in substantially equal proportions. Here it will be converted into a mist or cloud, and if desired, also heated by the heating element 26 which will promote its rapid vaporization. The nebula thus formed will ascend naturally to the upper portion of the closed vaporizing chamber 23 and will be drawn down through the legs 29 of the U-coils, and through the partition 28 to the other legs 30 of the coils, which legs may be disposed at an angle of approximately 15° to the vertical.

The air drawn upwardly through the device by the action of the circulating fan 47 and entering through the openings 15 in the air compartment 13 will be drawn up through the mixing chamber 27 about the spray rings 23 and the inner spray nozzles 24a, receiving a moisture content from the spray nozzles before the air is brought into intimate contact with the nebulized mist which passes through the U-tubes from the vaporizing chamber 25.

The partially saturated air, reaching the upper portion of the mixing chamber 27, will be forced past the open upper ends of the converging legs 30 and thus pick up the moisture cloud or admixture from the vaporizing chamber 25. It is, of course, understood that this moisture cloud may not only be heated to supply the necessary rise in temperature to the partially moistened air passing up through the apparatus, but when desired, the cooling coil 53 may be used to lower the temperature of the moisture cloud which passes from the vaporizing chamber 25. Thus, the air may be properly tempered and also may be properly conditioned as to moisture content. Owing to the arrangement of the legs 30, a greater approach to the saturation point will be had.

The saturated air will move upwardly and through the opening 40 in the lowermost baffle 39 and against the curved lower surface 35 of the hub, being diverted thereby horizontally through the space between the disk 32 and ring 39 of the first blower or fan element which is rapidly rotating and the curved blades 33 of which whirl the moistened air with great force outwardly against the side wall 31 of the cleaning unit. The action of the suction created by the circulating fan 47 draws the air upwardly against the next conical baffle plate 39 and above the disk 32 of the lower fan element through which the moistened air has just passed.

As the moistened air passes beneath this second baffle 39 it is drawn between the tangential vanes 41 which are disposed so as to catch the air which has been in rotating movement from the lower fan element and direct this rotating air centrally into the space between the next central opening 35 of the succeeding higher fan or blower element, through which the moistened air passes, as previously described. The air is thus subjected to a sequence of rapid movements centrifugally and centripetally, and the air will be cleaned and freed from foreign substances and any liquid will be precipitated.

Such liquid will find its way downwardly again to the air chamber and through the screen 16 to the liquid reservoir.

The humidified and cleaned air ascending from the cleaning unit will pass through the fan 47 and be driven outwardly thereby through the louvre rings 48 which will divert the same upwardly in the hollow cones diverging outwardly and having the effect to distribute the purified and moistened air to all parts of the room.

If the air is to be heated, the heating element 26 may be turned on at any time, or if the air is to be cooled, the coil 53 is set in operation.

It is, of course, understood that when the apparatus is to be used for conducting conditioned and tempered air to the remote portions of a building or the like, any suitable conductor pipes or other means may be employed in connection with the upper end of the device either in connection with or in place of the louvre rings 48.

For the purpose of freeing the U-shaped pipes or tubes 30 from the products of condensation, which collect in the lower ends thereof, the tubes or pipes are provided with lead openings 57 which open downwardly and through which the products of condensation may drip back into the water receptacle or tank.

It will be obvious that various changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:

1. In apparatus for conditioning air, separated vaporizing and mixing chambers, numerous U-shaped pipes extending between said chambers and having opposed legs disposed in the respective chambers, the legs in the mixing chamber converging upwardly, and means for drawing air through the mixing chamber.

2. In apparatus for conditioning air, a water reservoir, an air compartment above the reservoir having free communication with the outside air and in communication with said water reservoir, a vaporizing chamber above said compartment in communication with the water chamber, means for introducing water from the reservoir to the vaporizing chamber under force, a mixing chamber extending above and in communication with said air compartment and having numerous small ducts in communication with the vaporizing chamber, means for forcing water under pressure into said mixing chamber, and means above said mixing chamber for drawing air upwardly therethrough.

3. In apparatus for conditioning air, a water reservoir, an air compartment above said reservoir having free communication with the outside atmosphere, a nozzle extending from the air compartment into the reservoir, a mixing chamber extending upwardly from the air compartment and in communication therewith, a vaporizing chamber surrounding said mixing chamber, connections between said water reservoir and the vaporizing chamber, a force pump for circulating water through said connections, substantially U-shaped pipes extending between said vaporizing and mixing chambers, and a fan above and in communication with said mixing chamber for drawing air therethrough and through said U-shaped pipes.

4. In apparatus for conditioning air, a wheeled carriage, a motor carried thereby, vaporizing and mixing chambers disposed in communication and supported by said carriage, a water reservoir on the carriage, a pump in said reservoir driven by said motor for circulating liquid to said vaporizing chamber, an air compartment carried by said carriage and in communication with the lower portion of said mixing chamber, a cleaning unit driven by said motor and disposed above the mixing chamber, a fan also driven by said motor disposed above the cleaning unit, and circular louvre rings disposed on the outside of said fan.

5. In apparatus for conditioning air, air humidifying means, and air cleaning means including rotary blowers composed of hubs, discs secured to the hubs, curved blades carried by the outer portions of the discs and rings carried by the curved bades, and stationary elements including conical baffles having central openings and tangential vanes carried by said baffle.

WILLIAM J. BROCKER.